Aug. 19, 1969    B. B. RAYFORD    3,461,622
DOP STICK
Filed May 5, 1966
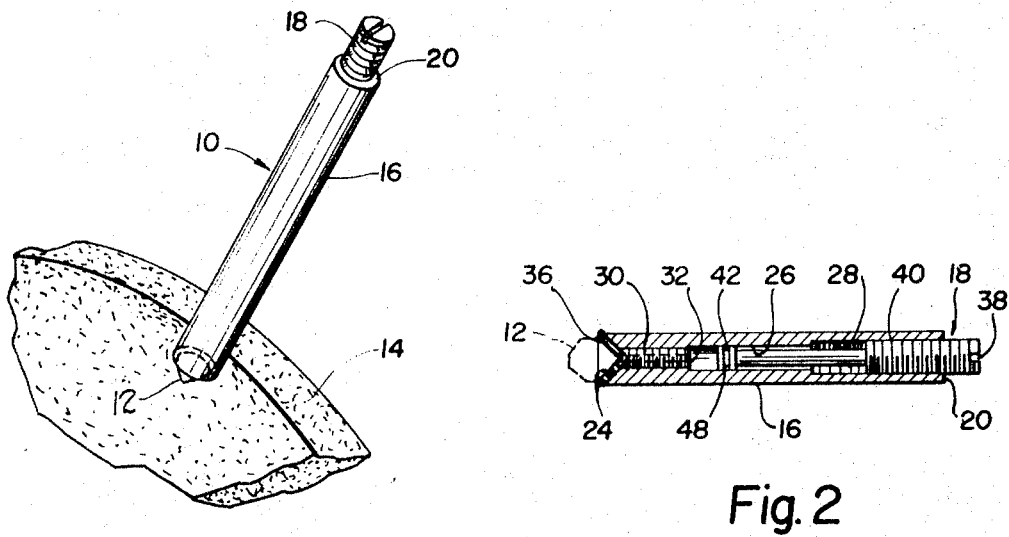
Fig. 1
Fig. 2
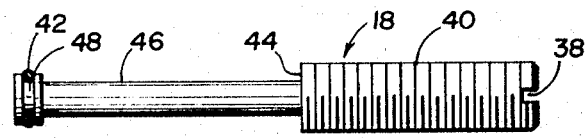
Fig. 3
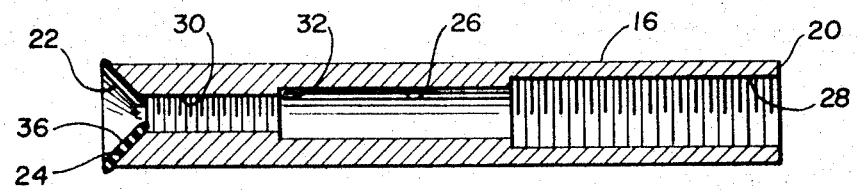
Fig. 4
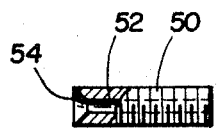
Fig. 5
INVENTOR
BROOKS B. RAYFORD
BY Watts & Fisher
ATTORNEYS

United States Patent Office 3,461,622
Patented Aug. 19, 1969

3,461,622
DOP STICK
Brooks B. Rayford, Springfield, Ohio
(614 E. 140th St., Cleveland, Ohio 44110)
Filed May 5, 1966, Ser. No. 547,825
Int. Cl. B24b *19/00, 47/00;* B25b *11/00*
U.S. Cl. 51—229                          5 Claims

ABSTRACT OF THE DISCLOSURE

A device for mounting a small workpiece such as a gem wherein the workpiece is applied to an elongated member having a gas-filled chamber and the pressure is reduced within the chamber by means of a screw mounted plunger to thereby hold the workpiece. Additional mounting devices are provided for mounting small workpieces of a variety of sizes.

---

This invention relates to an apparatus for mounting workpieces and more particularly relates to the method and apparatus for temporarily mounting small workpieces such as gems during cutting or polishing operations.

Gems may be formed by cutting, grinding, and polishing a variety of materials such as glass, plastics, and precious stones. Lenses are another type of workpiece that must be ground and polished from a hard material. The mounting of such workpieces is difficult and contributes greatly to the expense of the finished item.

These workpieces are typically of small size and very hard. They frequently also have many sides so that it is difficult to hold them during the extensive working operations necessary to bring them to a finished state.

Frequently, these workpieces are mounted to a dop stick with a cement or adhesive. The cement or adhesive is heated and the gems pressed against it so that when it hardens, the gem will be fastened to the dop stick. After one side of the dop stick has been finished, the cement or adhesive is heated again to release the gem. Then the gem is cleaned to remove any adhesive or cement that has adhered to it. It may then be reversed in position on the dop stick and refastened through the cement or adhesive.

This operation requires considerable time. This is particularly true when the gem must be changed in position several times during its working period. Furthermore, the working of the gem causes it to heat up. The heat generated in this manner often causes the cement or adhesive to loosen so that work must be stopped until the gem cools. In the alternative, artificial cooling must be used during the working of the gem in order to maintain the hardness of the cement or adhesive.

The dop stick of this invention alleviates many of the difficulties of mounting workpieces. The workpiece is held to the dop stick in this invention by a vacuum. The vacuum is not released by the heating of the gem stone as the gem stone is worked upon. Furthermore, the workpiece can be transferred from one dop stick to another quickly and easily.

The dop stick is small in size and may be comfortably held by one of the gem cutter's hands, or by a facetor. Since it is not necessary to artificially cool the dop stick, it is light and freely movable. The dop stick of this invention can be easily adapted to hold different size workpieces.

The dop stick of this invention includes a shaft having a center bore extending extirely through the shaft with an aperture at one end of the shaft into the workpiece is placed and having a screw mounted plunger closing the other side of the bore to create a vacuum in the bore which holds the gem to the aperture on one side as the plunger is withdrawn towards the other side of the bore by turning the screw thus creating a reduced pressure. A sealing material such as glycerin may be placed in the bore to aid in maintaining a vacuum.

Different sized workpieces may be accommodated through the use of attachments having threads on one end and gem holding apertures on the other. The side of the bore adjacent to the gem holding aperture of the main dop stick is tapped so that the attachment may be screwed into it. In this way, it acts as an adaptor to provide a smaller holding aperture for gems. The vacuum in the center bore of the attachment is created by the main plunger in the main dop stick.

Accordingly, it is an object of this invention to provide an improved apparatus for mounting workpieces.

The above noted and other features of the invention will be understood better and more fully from the following detailed description when considered in conjunction with the accompanying drawings in which:

FIGURE 1 is a perspective drawing showing the manner in which the dop stick of this invention is utilized in mounting a gem for grinding;

FIGURE 2 is a sectional view taken along the longitudinal axis of an embodiment of the invention;

FIGURE 3 is a view of the plunger included in an embodiment of this invention, taken along its longitudinal axis;

FIGURE 4 is a sectional view of the outer housing of an embodiment of this invention; and FIGURE 5 is a sectional view of an attachment which may form a part of an embodiment of this invention which may accommodate smaller workpieces.

In FIGURE 1 a dop stick 10 is shown holding a gem 12 for grinding against the abrasive wheel 14. The dop stick 10 includes a cylindrical housing 16 having a tapped bore through its center. A screw 18 is mounted in one end of the dop stick 10 and contains a plunger which is moved towards the end 20 of the dop stick when the screw 10 is turned in a counterclockwise direction. The gem 12 is mounted in an end 22 of the dop stick 10 to close its opposite aperture against a soft gasket padding 24, which may extend over the bottom face of the dop stick to hold flat pieces of work material. This gasket may be of rubber, plastic or any suitable soft material. The gem is held in the tubular dop stick 10 by a vacuum created within its internal bore by turning the screw 18 in a counterclockwise direction to move the plunger towards the end 20 of the dop stick 10.

Many advantages of the dop stick of this invention can be seen from FIGURE 1. The dop stick can be easily held in the hand of the grinder. Also, it is of a convenient shape to be clamped in a vise or facetor if it is desired to do so. Different faces of the gem may be uncovered for working by attaching the gem to a second dop stick while it is still held by the first dop stick thus holding gem accuracy. The gem is easily released from the first dop stick by reducing the vacuum and pulling the gem stone free. Furthermore, the dop stick is inexpensive and simply constructed. It is unencumbered by artificial cooling means designed to keep an adhesive or cement at a low enough temperature to hold the gem stone firmly during working of the gem stone.

In FIGURE 2, a sectional view of the dop stick of this invention is shown having a tubular steel housing with a first end 20 and a second end 22. The housing 16 has an internal stepped bore 26 which has a first threaded portion 28 at the end of the housing 16 nearest to the end 20 and a second threaded portion 30 near the other end of the housing 22. The bore 26 has a shoulder 32 near the end 22 of the housing so that the threaded portion 30 has a smaller diameter than the threaded portion 28. The annular rubber lining 24 is held to the tapered section of the bore 26 adjacent to the side 22 of the housing by a layer of lacquer 34. The gem 12 may be sealed to the soft rubber liner by a layer of wax or shellac 36.

The threaded plunger 18 contains a slot 38 formed to adapt to a screw driver. This plunger could include a Phillips head screw or any other device to turn the plunger. The end 40 of the threaded plunger contains a thread adapted to be screwed into the threaded portion 28 of the bore 26 with the plunger end of the threaded plunger closing the bore 26 with an O-ring 42 which could be of plastic or any other suitable material. A sealing material such as glycerin may be placed in the bore 26 to aid in sealing the bore against the escape of air. It can be seen that as the threaded plunger 18 is screwed out, the part of the bore 26 closest to the end 22 of the housing 16 becomes evacuated to form a pressure connection with the gem stone 12.

In FIGURE 3, the threaded plunger 18 is shown having the recessed slot 38 to accommodate a screw driver and having a threaded end 40 to engage the threaded portion of the bore 26. It has a shoulder 44 shaped to accommodate a stem portion 46 of the plunger and a head portion 48 which has substantially the same diameter as that of the larger portion of the bore 26. An O-ring of rubber or other suitable material 42 is mounted thereon to form a substantially air-tight contact with the bore 26 which contains the sealant.

In FIGURE 4, a sectional view of the housing taken along its longitudinal axis is shown having the flat end portion 20 and an internal bore 26. The bore 26 includes a threaded portion 28 adjacent to the end 20, an unthreaded portion near the center of the longitudinal axis of the housing 16 having the same diameter or the tapped portion 28, a shoulder 32 adjacent to the unthreaded portion of the bore 26 leading to a narrower threaded portion 30 of the bore 26 which connects the bore to a tapered end portion 22 of the dop stick. The tapered end portion 22 supports an annular rubber pad 24 which is fastened to the tapered portion 22 by a layer of lacquer or other suitable material 34. The pad 24 may be formed by dipping the end portion 22 in a rubber or plastic material.

In FIGURE 5, an attachment to the dop stick is shown having a tubular shape with a threaded portion 50 on one end adapted to be threaded into the threaded portion 30 of the bore 26 of the dop stick and having an internal bore 52 with a tapered aperture 54 on the opposite end of the attachment as the threaded portion 50. The tapered portion 54 also contains an annular rubber padding adapted to hold a gem. However, it is of much smaller size than the tapered portion 22 of the bore 26 of the dop stick.

When the attachment of FIGURE 5 has been threaded into the threaded portion 30 of the dop stick, a smaller gem may be mounted on the end 54. This gem can be held by the vacuum in the bore 26 which applies suction to the gem through the bore 52. It is evident that a series of such attachments may be provided so as to adapt the dop stick to a plurality of different shaped workpieces. Furthermore, the tapered sides 22 from the internal bore may have different slopes and shapes in the various attachments to better accommodate different shapes of the gem being ground.

Although in the preferred embodiment the dop stick is described as being made of steel, it is clear that plastic, spun glass or other suitable materials could be used for some of the parts.

It can be seen that the dop stick of this invention can be economically fabricated. It is easy to handle or to mount on a facetor since it is light and small and unencumbered with forced cooling apparatus. Since it holds the workpiece by a vacuum, it is relatively unaffected by the heat of the workpiece while the workpiece is being cut. Furthermore, attachments are easily provided to adapt the dop stick to cut different size workpieces and different shape workpieces. Different surfaces of the same workpiece can be easily exposed by transferring the workpiece from one dop stick to the other which transfer can be effected by attaching a second dop stick before the workpiece is released from the first dop stick.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A dop stick comprising:
(a) a rigid tubular housing defining a chamber;
(b) said chamber having an orifice adapted to receive a small workpiece such as a gem;
(c) an annular pad mounted on the housing adjacent the orifice for mounting the workpiece thereon;
(d) a sealant material on the pad for contacting the workpiece;
(e) a plunger;
(f) said plunger having an enlarged portion forming an air-tight relationship with said housing and a threaded portion mounted on threads in said housing such that said enlarged portion may be moved in said chamber towards or away from said orifice;
(g) a sealant material in said chamber to facilitate said air-tight relationship; and
(h) means by which said threaded portion of said plunger may be turned, whereby said enlarged portion of said plunger may be moved away from said orifice to reduce the pressure in said chamber to thereby hold a workpiece closing said orifice and whereby said enlarged portion of said plunger may be moved toward said orifice to increase the gas pressure in said chamber and thereby release a workpiece closing said orifice.

2. A dop stick in accordance with claim 1 in which said housing is a steel member having a cylindrical bore defining said chamber and being tapped on one end to engage the threaded portion of said plunger.

3. A dop stick in accordance with claim 2 in which said chamber includes a bore of smaller diameter leading to said orifice.

4. A dop stick in accordance with claim 3 in which said smaller portion of said chamber is threaded.

5. A dop stick in accordance with claim 1 further comprising an attachment having screw threads on one portion sized to be engaged with the threads of said smaller portion of said chamber, having a bore extending through said attachment and passing along the longitudinal axis of said threads on said one end of said attachment, and having an orifice at its other end adapted to be closed by a workpiece, whereby a workpiece may be mounted on the orifice of said attachment and held there by the reduced air pressure developed in said bore of said dop stick by moving said plunger away from said orifice of said housing.

References Cited

UNITED STATES PATENTS

| 397,835 | 2/1889 | Cuthbert. | |
| 881,899 | 3/1908 | Chapman | 279—34 X |
| 2,684,191 | 7/1954 | Dolman | 53—386 X |
| 2,858,597 | 11/1958 | Kraemer | 51—235 X |
| 3,274,737 | 9/1966 | Rocher | 51—235 X |

FOREIGN PATENTS 912,441  12/1962  Great Britain.

HAROLD D. WHITEHEAD, Primary Examiner

U.S. Cl. X.R.

51—235; 269—21